(12) United States Patent
Reischl et al.

(10) Patent No.: US 11,009,027 B2
(45) Date of Patent: May 18, 2021

(54) SELF-PUMPING VACUUM ROTOR SYSTEM

(71) Applicant: Enrichment Technology Company Ltd. Zweigniederlassung Deutschland, Jülich (DE)

(72) Inventors: Hubert Reischl, Gronau (DE); Edwin Zimmermann, Stolberg (DE)

(73) Assignee: ENRICHMENT TECHNOLOGY COMPANY LTD. ZWEIGNIEDERLASSUNG DEUTSCHLAND

( * ) Notice: Subject to any disclaimer, the term of this patent is extended or adjusted under 35 U.S.C. 154(b) by 320 days.

(21) Appl. No.: 16/076,541

(22) PCT Filed: Jan. 25, 2017

(86) PCT No.: PCT/EP2017/051527
§ 371 (c)(1),
(2) Date: Aug. 8, 2018

(87) PCT Pub. No.: WO2017/137257
PCT Pub. Date: Aug. 17, 2017

(65) Prior Publication Data
US 2019/0055948 A1 Feb. 21, 2019

(30) Foreign Application Priority Data
Feb. 12, 2016 (EP) ..................... 16155415

(51) Int. Cl.
*F04D 17/16* (2006.01)
*F03G 3/08* (2006.01)
(Continued)

(52) U.S. Cl.
CPC ............. *F04D 17/168* (2013.01); *F03G 3/08* (2013.01); *F04D 1/12* (2013.01); *F04D 29/284* (2013.01); *F16F 15/30* (2013.01)

(58) Field of Classification Search
CPC ........ F04D 1/12; F04D 17/168; F04D 29/284; F16F 15/30; F03G 3/08
See application file for complete search history.

(56) References Cited

U.S. PATENT DOCUMENTS 5,462,402 A * 10/1995 Bakholdin ............. H02K 7/025
                                                            415/90
5,893,702 A *  4/1999 Conrad .................. F04D 19/046
                                                            415/71
(Continued)

FOREIGN PATENT DOCUMENTS

EP    2698557 A1    2/2014
EP    2730782 A2    5/2014
RU    1433133 C     3/1994

OTHER PUBLICATIONS

Database WPI, Week 199437, Nov. 2, 1994, Thomson Scientific, London GB; AN 1994-300620, XP002761317.
(Continued)

*Primary Examiner* — Igor Kershteyn
(74) *Attorney, Agent, or Firm* — Tarolli, Sundheim, Covell & Tummino LLP

(57) ABSTRACT

A vacuum rotor system is provided comprising a hollow rotor with a rotor jacket that is open at both ends perpendicular to the axis of rotation and with at least two hubs that are connected to the inside of the rotor jacket and that are suitably mounted in appropriate bearings so that the rotor can rotate. A machine housing that encloses the rotor and that has at least one gas outlet opening to discharge gases from the machine housing. A vacuum system that is connected to the gas outlet opening and that has at least one forepump for generating a fore-vacuum pressure in the machine housing. At least one first gas removal device with
(Continued)

a gas pick-up opening is arranged in the machine housing between the hub and the appertaining open end of the rotor jacket.

16 Claims, 6 Drawing Sheets

(51) Int. Cl.
  *F04D 29/28* (2006.01)
  *F16F 15/30* (2006.01)
  *F04D 1/12* (2006.01)

(56) References Cited

U.S. PATENT DOCUMENTS

2013/0264914 A1* 10/2013 Kalev .................... H02K 7/025
                                                        310/68 B
2015/0211599 A1*  7/2015 Baumer ................ F16F 15/305
                                                        74/572.12

OTHER PUBLICATIONS

International Search Report for corresponding International Application No. PCT/EP2017/051527, dated Apr. 7, 2017.
International Preliminary Report on Patentability corresponding to Application No. PCT/EP2017/051527, dated Aug. 14, 2018.

* cited by examiner

SELF-PUMPING VACUUM ROTOR SYSTEM

RELATED APPLICATIONS

The present invention is a U.S. National Stage under 35 USC 371 patent application, claiming priority to Serial No. PCT/EP2017/051527, filed on 25 Jan. 2017; which claims priority of EP 16155415.9, filed on 12 Feb. 2016, the entirety of both of which are incorporated herein by reference.

FIELD OF THE INVENTION

The invention relates to a vacuum rotor system that, owing to its arrangement, is configured to be self-pumping, and it also relates to a method for operating this vacuum rotor system.

BACKGROUND OF THE INVENTION

Rotors are turning (rotating) parts of a machine or aggregate. Rotors are often used as so-called flywheels for the storage of kinetic energy (rotational energy and inertia) in that their rotational movement (rotation) is stored with the least possible friction loss so that it can be used on an as-needed basis. Moreover, flywheels are also used to stabilize satellites or airplanes.

In the case of flywheels for the storage of energy (flywheel energy storage units), electric energy in the form of rotational energy can be stored in the rotating flywheels and, when needed, this energy can be converted back into electric energy and can be released to a consumer. For the most part, such flywheel energy storage units have a hollow cylinder as the rotor which, depending on its rotational speed and mass, stores a certain amount of energy. The storage capacity of such an energy storage unit is limited by its maximum rotational speed. The formula for calculating the energy content of a rotational body (rotor) shows that a rotational body (rotor) having a high energy content should preferentially be configured to have a high rotational speed rather than a high mass. Rotors of flywheel energy storage units, depending on the load state, can rotate at a speed of, for example, 50,000 revolutions per minute. A typical speed range is between 15,000 rpm and the maximum rotational speed. In order for the rotors of the flywheel storage units to rotate with as little loss as possible so that they can store the energy with as little loss as possible, they are enclosed in a machine housing, whereby, during operation of the flywheel, a pressure that is as low as possible is generated in the individual rotor housings. The lower the pressure and the density of the gas in the rotor housing, the lower the friction losses of the rotor vis-à-vis the filling gas of the machine housing. For this reason, the housing is normally evacuated. In order for the minimum vacuum needed for an efficient low-loss operation of the flywheels to be generated in the appertaining flywheel energy storage units, a pump system that delivers operating pressures of $10^{-3}$ mbar or less and that consists of a forepump (e.g. a rotary vane pump) and a main pump (e.g. a turbomolecular pump) is used for each flywheel. Even though an individual forepump can generate the fore-vacuum pressure for all of the flywheels by means of a suitably configured pipe system to which all of the flywheel energy storage units of an energy storage system having several flywheels are connected, individual main pumps each have to be connected directly to the machine housings in order to generate the requisite operating vacuum in the machine housings for each flywheel (rotor). For this purpose, turbomolecular pumps are generally used as the main pumps. Turbomolecular pumps are expensive components whose maintenance requires a lot of work. In the case of an energy storage unit having a plurality of flywheels operated in parallel, for instance, 32 flywheels in such a storage unit, it is also necessary to employ a corresponding number of turbomolecular pumps, thereby markedly increasing the price tag of the installation. Moreover, when such energy storage units are operated, it is to be expected that dirt and particles will become detached from the rotors. Turbomolecular pumps, however, are very sensitive to dirt and particles, which increases the tendency of such installations to fail. Moreover, when turbomolecular pumps are used, there is a need for large suction cross sections. Large openings, which are even installed in awkward places, pose a considerably greater risk that gas or dust might escape if a so-called rotor crash occurs.

In the market of energy storage units, flywheel energy storage units are competing with other energy storage technologies such as, for example, battery storage devices. For this reason, there is a need for a flywheel energy storage unit which can be manufactured as inexpensively as possible but which can nevertheless be operated efficiently, with low losses, reliably and with little maintenance work.

SUMMARY OF THE INVENTION

Before this backdrop, it is the objective of the invention to put forward a flywheel energy storage unit which can be manufactured inexpensively and which can be operated efficiently, with low losses, reliably and with little maintenance work.

This objective is achieved by means of a vacuum rotor system comprising a hollow rotor with a rotor jacket that is open at both ends perpendicular to the axis of rotation and with at least two hubs that are connected to the inside of the rotor jacket and that are suitably mounted in appropriate bearings so that the rotor can rotate, also comprising a machine housing that encloses the rotor and that has at least one gas outlet opening to discharge gases from the machine housing, also comprising a vacuum system that is connected to the gas outlet opening and that has at least one forepump for purposes of generating a fore-vacuum pressure in the machine housing, and also comprising at least one first gas removal device with a gas pick-up opening that is arranged in the machine housing between the hub and the appertaining open end of the rotor jacket, at a suitable distance from the inside of the rotor jacket without making contact with the rotor jacket, in order to efficiently pick up gas, whereby said first gas removal device is connected to the gas outlet opening in order to discharge the picked-up gas and it is arranged in such a way that, at a rotational frequency greater than 200 Hz, the rotor itself conveys part of the gas flow that, due to the rotation of the rotor, is moving along the inside of the rotor jacket, at least into the first gas removal device, and consequently, the rotor itself can reduce the gas pressure in the machine housing from the level of the fore-vacuum pressure to a lower operating vacuum pressure.

The vacuum rotor system according to the invention is used, for example, in flywheel energy storage units. In order to maximize the energy content of a flywheel energy storage unit, the rotor of the vacuum rotor system, with a low intrinsic weight, is brought up to the maximum rotational speed since, when it comes to the maximum energy content, the rotational speed makes a quadratic contribution while the weight, in contrast, only makes a linear contribution. In this context, the rotor (or also the rotational body) is joined via two or more hubs to the bearing and drive elements of the flywheel energy storage unit. On the one hand, the hubs have to create a connection and an attachment of the rotor jacket to the bearing elements and the drive elements and, on the other hand, they have to ensure the transmission of the torsional moments from the drive shaft to the rotor jacket and vice versa. The hubs are characterized in that they are sufficiently strong vis-à-vis mechanical loads so as to reliably withstand the radial and tangential loads at very high rotational speeds of more than 50,000 rpm due to the centrifugal forces acting upon the rotor jacket, and also to support the weight load exerted by the rotor jacket. The nominal rotational frequencies of the rotors in applications involving flywheel energy storage units are, for example, within the range of 750 Hz, whereby the rotational frequencies increase when energy is being picked up and they decrease when energy is being released. The rotor jacket and the hubs are made, for instance, of a CFRP laminate. Such a material is sufficiently sturdy and exhibits a favorable crash behavior in case of a rotor crash in the flywheel energy storage unit, and it also has a low weight which allows a simpler mounting of the rotor in bearings. Depending on the configuration, the hubs can be mounted separately from each other in the appertaining bearings by means of journals, or else they can be joined by a continuous shaft whose two opposite ends are then mounted in the appertaining bearings. The rotors of the vacuum rotor system or of the flywheel energy storage unit are enclosed in a machine housing for safety reasons as well as in order to generate an operating vacuum. Suitable machine housings are made, for example, of steel and their wall thickness is sufficient to compensate for the crash loads of the rotors. The person skilled in the art can calculate the requisite minimum wall thicknesses on the basis of the rotational energy of the rotor.

In order for the rotor of the appertaining vacuum rotor system to rotate in a flywheel energy storage unit with the lowest possible losses and thus to be able to store the energy with the lowest possible losses, the vacuum system employs one or more forepumps, for example, rotary vane pumps, to pump the pressure in the machine housing that encloses the rotor down to a fore-vacuum pressure, for instance, in the order of magnitude $10^{-2}$ mbar. This pressure, however, is not sufficiently low to allow a long-term low-friction and thus low-loss operation of the rotors or of the flywheel energy storage unit. The lower the pressure and the density of the gas in the machine housing, the lower the friction losses of the rotor vis-à-vis the residual gas in the machine housing. The present system according to the invention is advantageously suitable to further reduce the fore-vacuum pressure by at least one order of magnitude owing to the self-pumping effect of the rotor by making use of gas removal devices suitably arranged according to the invention, so that pressures of $10^{-3}$ mbar or less can be ensured as the operating vacuum while also avoiding the use of main pumps such as, for example, turbopumps.

Owing to the rotation of the rotor, the gas present inside the machine housing is likewise made to rotate by the effect of friction on the rotor. Whereas only a small gap is present between the rotor jacket and the machine housing, the hollow rotor has a comparatively large diameter inside the rotor jacket, so that most of the gas present in the machine housing is located inside the rotor or inside the volume defined by the rotating rotor jacket. The correspondingly rotating gas is pressed against the inside of the rotor jacket by the centrifugal force and, along with the rotating rotor jacket, flows around the axis of rotation of the rotor. The centrifugal forces generate a pressure distribution with a pressure gradient along the radius of the rotor jacket, whereby the pressure is greatest directly on the inside surface of the rotor jacket and smallest at the axis of rotation, as seen in the radial direction. If a gas removal device is then placed in the vicinity of the inside of the rotor jacket whose gas removal surface is oriented perpendicular in the direction facing the gas flow that is rotating along with the rotating rotor jacket, then the rotating gas can be discharged through this gas removal opening very efficiently since the highest pressure inside the rotor prevails close to the inside of the surface of the rotor jacket. Even though the same principle would also lead to gas being picked up through the gas removal opening in other positions inside the rotor jacket, owing to the lower pressure that prevails there (radial pressure gradient), the resulting pumping capacity would be considerably less efficient at other points closer to the axis of rotation due to the rotation of the rotor and the gas removal. The suitable distance constitutes a compromise between a minimum distance—in order to absolutely avoid unwanted contact between the gas removal device and the insides of the rotor jacket, since, at the intended rotational frequencies of the rotor, such a contact would destroy the gas removal device and conceivably also the rotor jacket—and the desire, in the ideal case, to convey the gas in the rotor out of the machine housing directly on the inside of the rotor jacket in case of the highest local pressure.

For this reason, in one embodiment, the distance between the gas pick-up opening of the first gas removal device and the rotor jacket is less than 10% of the radius of the rotor at this place. In the case of cylindrical rotor jackets, the radius at this place is the general location-independent radius of the rotor jacket. In the case of rotor jackets with other shapes, the above-mentioned radius refers to the radius that the rotor jacket has perpendicular to the axis of rotation at the location of the gas removal device. In a preferred embodiment, the distance between the gas removal opening and the inside of the rotor jacket is between 1% and 5% of the radius of the rotor at this place.

Devices having different shapes and configurations can be used as the gas removal device, whereby these devices have a channel that is open for gases between the gas removal opening and the gas outlet opening. In this context, one or more gas removal devices can be connected to the same gas outlet opening, provided that the rotor configuration and the bearing configuration permit the arrangement of several gas removal devices on the same side of the rotor or of the hub. The material of which the gas removal device is made should be a vacuum-capable material that displays only a slight or negligible level of intrinsic out-gassing. For instance, pipe connections that extend in the radial direction from the gas outlet opening all the way to the rotor jacket and that have a curvature before reaching the rotor jacket can be employed as gas removal devices, so that the open pipe opening faces in the direction of the gas flow along the inside of the rotor jacket, whereby the gas removal surface refers to the surface that is oriented perpendicular to the gas flow. In this context, the gas removal opening can have different shapes, for example, round, oval or elliptical shapes. Excessively sharp-edged forms can be unsuitable due to the turbulence that they cause in the gas flow. Here, the gas outlet opening refers to the opening in the machine housing through which the gas in the machine housing would have been directly pumped off if the gas removal device had not been connected to the gas outlet opening. The gas that the gas removal device has already removed through the gas outlet opening is only transported to the outside of the machine housing.

Thanks to this invention, the resistance of the vacuum rotor system to dirt and particles is considerably enhanced since there is no longer a need for turbopumps that are sensitive to such dirt and particles. As a result, the vacuum rotor system is extremely maintenance-friendly and reliable. The avoidance of turbopumps also reduces the component costs of the entire system. Nevertheless, with the system according to the invention, it is possible to generate at least the requisite operating pressure, so that the vacuum rotor system can continue to operate in a very low-loss and efficient manner Owing to this invention, the flexibility of the vacuum rotor system is also considerably enhanced. The gas removal devices can be installed close to the attachment points or close to the stand (as seen in the parallel direction relative to the axis of rotation), as a result of which the risk that gases and dust might escape in case of a crash is considerably reduced due to the higher stability and reduced cross sections.

Consequently, this invention puts forward a vacuum rotor system for flywheel energy storage units with which, for instance, a flywheel energy storage unit can be manufactured inexpensively and which can be operated efficiently, with low losses, reliably and with little maintenance work.

In one embodiment, the gas pick-up opening comprises an efficient gas pick-up surface that has a mean diameter and is oriented along the rotor jacket perpendicular to the gas flow. In the case of such an orientation perpendicular to the gas flow, the gas pick-up through the gas removal opening is at a maximum. Here, the mean diameter refers to the value averaged on the basis of the distances between all of the points at the edge of the gas removal opening and their geometric midpoint. In the case of a circle, the radius for all of the points at the edge is known to be the same, so that the mean radius of a circle is the same as the radius of the circle. Other mean diameters can be obtained in the case of surfaces that differ from a circular shape.

In one embodiment, the first gas removal device is arranged inside the rotor jacket at a distance from the open end of the rotor jacket which amounts to at least three times the mean diameter. This distance avoids a reduced gas removal through the gas removal opening caused by turbulence or draining effects at the open ends of the rotor jacket. The gas flow is stabilized in the case of the distance specified above or in the case of greater distances, as a result of which this is best suited for the gas removal. As long as the above-mentioned minimum distance is maintained, for the rest, the distance can be selected as desired.

In another embodiment, the mean diameter is between 3% and 10% of the radius of the rotor at this place. Gas removal surfaces of such a size have the largest gas-removal capacity. Smaller openings would convey less gas out of the machine housing. Larger openings would disrupt the gas flow excessively, which would likewise negatively affect the gas removal.

In another embodiment, the first gas removal device has a cross section parallel to the gas flow along the insides of the rotor jacket that is suitable to minimize turbulence of the gas flow through the first gas removal device. This turbulence should also be avoided or minimized since this would also lead to a reduction of the gas removal. For this reason, in a preferred embodiment, the cross section is round or oval.

In another embodiment, as was the case with the first gas removal device, at least one second gas removal device is arranged between the other hub and one end of the rotor jacket that correspondingly belongs to this other hub, at a suitable distance from the inside of the rotor jacket without making contact with the rotor jacket, in order to pick up gas. Thanks to this second gas removal device (and optionally several second gas removal devices), also on the other side of the rotor, and thus on the other side of the first gas removal device, it is possible to convey gas out of the machine housing or out of the open end of the rotor, thereby further improving the operating pressure.

In one embodiment, the hubs define an intermediate volume between the hubs in the hollow rotor, and the second gas removal device is arranged in such a way that the gas that has been picked up is conveyed into the intermediate volume. In this manner, the gas is removed from the area of the rotor that is connected to the gap between the rotor jacket and the machine housing. Therefore, the gas pressure is lowered, at least in the gap, which further reduces the friction losses during operation of the rotor. As soon as the rotational frequency of the rotor slows down, however, the gas that has been temporarily stored in the intermediate volume can again escape into the other area of the rotor. Consequently, this solution constitutes only a temporary intermediate storage measure to temporarily reduce friction losses.

In another embodiment, the hubs are configured so as to be impermeable to gas in order to form a gas-tight intermediate volume. In this manner, the gas that is in intermediate storage is temporarily picked up in a reliable manner. In a preferred embodiment, an at least partially gas-absorbing layer is arranged on the inside of the intermediate volume. This gas-absorbing layer binds the gas permanently or else constitutes a sizeable buffer, which lowers the operating pressure in the machine housing either permanently or else for a prolonged period of time. Examples of suitable adhesive layers are layers of activated carbon or of other natural or synthetic zeolites or other substances that are also referred to as molecular sieves. Molecular sieves have a large inner surface area (for example, 600 to 700 $m^2/g$) and have uniform pore diameters that are in the order of magnitude of the diameter of molecules and are therefore characterized by a high adsorption capacity for gases.

In one embodiment, the hub facing the second gas removal device is impermeable to gas and the hub facing the first gas removal device is at least partially permeable to gas, so that gas conveyed by the second gas removal device into the intermediate volume can escape through the gas-permeable hub in the direction of the first gas removal device. The second gas removal device conveys gas from the other open end of the rotor jacket into the intermediate volume, thereby ensuring a pressure rise in the intermediate volume, so that the pressure in the intermediate volume is higher than outside of the hubs. This is why gas escapes from the intermediate volume through the gas-permeable hub in the direction of the first gas removal device and then the latter can convey the gas out of the machine housing, thereby further lowering the operating pressure. The pumping off of the gas volume that is in intermediate storage is also improved at a low rotational speed. The gas permeability of the first (lower) hub can be achieved by means of an appropriate gas-permeable material or by gas-permeable passages, for instance, cutouts. In a preferred embodiment, the gas-permeable hub (first or lower hub) comprises a symmetrical arrangement of holes that serve to achieve the gas permeability. The symmetrical arrangement is intended to prevent unbalances during the rotation of the hubs. In this context, holes provide a gas permeability that can be predicted very precisely in comparison to gas-permeable materials.

In another embodiment, in order for the second gas removal device to discharge the gas it has picked up, it is connected directly to the gas outlet opening. As a result, the gases conveyed by the second gas removal device can be conveyed directly out of the machine housing, without the intermediate volume and the gas permeability having an impact on the gas flow towards the outside. In a preferred embodiment, the direct connection between the second gas removal device and the gas outlet opening runs through a shaft that joins the two hubs. Via a bore through the existent shaft, a gas channel can be provided in order to transport the gas away, without the need for additional components to be incorporated into the rotor.

In another embodiment, the vacuum rotor system comprises another gas outlet opening on the side of the machine housing that is opposite from the other gas outlet opening; in this context, in order for the second gas removal device to discharge the gas it has picked up, it is connected to the other gas pick-up opening which, in turn, is connected to the fore-vacuum system. With this embodiment, the gases that have been picked up by the second gas removal device can be conveyed out of the machine housing via the shortest path, an approach that involves the lowest pump resistance in terms of the vacuum, although this requires greater effort when it comes to configuring the vacuum system.

In another embodiment, the second gas removal device has a configuration that corresponds to the configuration of the first gas removal device according to one or more of the embodiments presented above. The second gas removal device can be, for instance, identical to the first gas removal device, although its local arrangement has to take into consideration the circumstances in the area of the other hub and of the other bearing.

The invention also relates to a flywheel energy storage unit comprising a plurality of vacuum rotor systems according to the invention, whereby, in order to generate a fore-vacuum pressure in each of the machine housings, the vacuum system of each vacuum rotor system is combined to form a joint energy storage vacuum system having at least one fore-vacuum pump that provides the fore-vacuum pressure in each machine housing. The operating vacuum is then generated in each machine housing by the rotating rotor itself in that, at rotational frequencies higher than 200 Hz, some of the flows of gas that, due to the rotation of the rotor, are moving along the inside of the rotor jacket are conveyed into the appertaining first gas removal device by means of the appertaining rotors themselves, and therefore they themselves can reduce the gas pressure in the appertaining machine housings from the level of the fore-vacuum pressure to lower operating pressures. The nominal rotational frequencies of the rotors in applications for flywheel energy storage units are, for example, within the range from 750 Hz, whereby the rotational frequencies increase when energy is picked up and they decrease when energy is removed.

The invention also relates to a method to operate the vacuum rotor system according to the invention comprising a hollow rotor with a rotor jacket that is open at both ends perpendicular to the axis of rotation and with at least two hubs that are connected to the inside of the rotor jacket and that are suitably mounted in appropriate bearings so that the rotor can rotate, also comprising a machine housing that encloses the rotor and that has at least one gas outlet opening to discharge gas from the machine housing, said method comprising the following steps:

a fore-vacuum pressure is generated in the machine housing by means of a vacuum system that is connected to the gas outlet opening and that has at least one forepump; and the pressure in the machine housing is reduced from the level of the fore-vacuum pressure to a lower operating vacuum pressure by means of the rotor itself, in that at least one first gas removal device having a gas pick-up opening to efficiently pick up gas in the machine housing is arranged between the hub and the appertaining open end of the rotor jacket, at a suitable distance from the inside of the rotor jacket without making contact with the rotor jacket, whereby said first gas removal device is connected to the gas outlet opening so that the gas that has been picked up can be discharged, whereby, at a rotational frequency of more than 200 Hz, the rotor itself conveys part of the gas flow that, due to the rotation of the rotor, is moving along the inside of the rotor jacket, at least into the first gas removal device.

BRIEF DESCRIPTION OF THE FIGURES

These and other aspects of the invention will be shown in detail in the figures as follows.

DETAILED DESCRIPTION OF THE EMBODIMENTS

Figure 1:
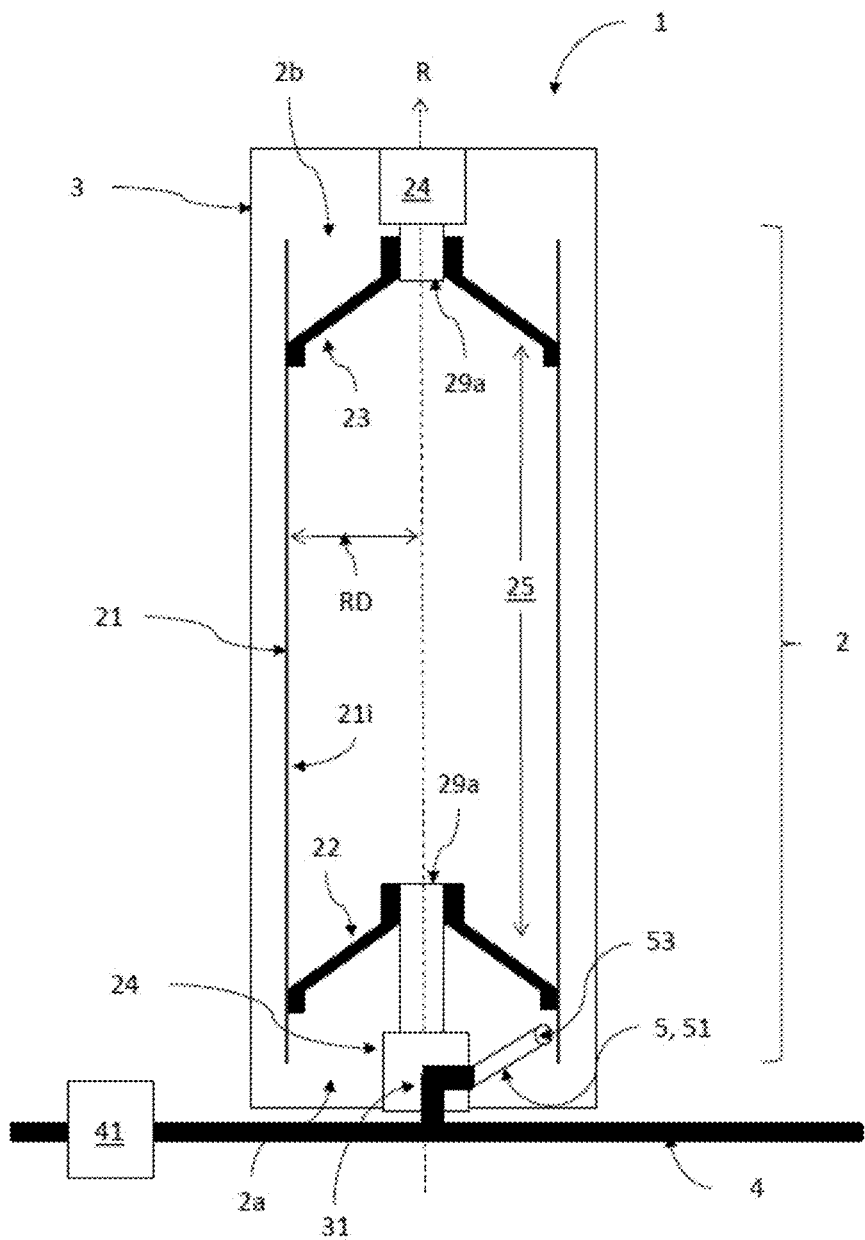
FIG. 1: an embodiment of the vacuum rotor system according to the invention, in a side view.

FIG. 1 shows an embodiment of the vacuum rotor system 1 according to the invention, in a side view, said system comprising a hollow rotor 2 with a rotor jacket 21 that is open at both ends 2*a*, 2*b*, namely, a first open end 2*a* and a second open end 2*b*, perpendicular to the axis of rotation R and with at least two hubs 22, 23 that are connected to the inside 21*i* of the rotor jacket 21 and that are suitably mounted in appropriate bearings 24 so that the rotor 2 can rotate. Here, the hub 22, which is arranged at the first open end 2*a*, is also referred to as the first hub 22. Accordingly, the hub 23, which is arranged at the other open end 2*b* (the second open end 2*b*), is also referred to as the second hub 23. The hollow rotor 2 is configured here as a cylindrical rotor having a cylindrical rotor jacket 21, whereby the appertaining cover surfaces of the cylindrical shape are open and therefore constitute the open ends 2*a* and 2*b*. The rotor shown here is set up vertically and it has an axis of rotation that is perpendicular to the ground. Consequently, for vertically arranged rotors, the first hub 22 is also referred to as the lower hub 22 (closer to the ground) while the second hub 23 is also referred to as the upper hub 23 (further away from the ground than the first or lower hub 22). In this embodiment, the rotor 2 is mounted via the hubs 22, 23 that are mounted separately from each other in separate journals 29a. In this embodiment, the hubs 22, 23 are joined to each other only via the rotor jacket 21. In an alternative embodiment, the hubs 22, 23 can also be mounted in the bearings 24 by means of a shared shaft 29 that runs through the entire rotor 2. Bearings that are suitable for rotational speeds of 50,000 rpm are known to the person skilled in the art. In this context, the rotor 2 is enclosed by a machine housing 3 having at least one gas outlet opening 31 that serves to discharge gases G from the machine housing 3 so as to ensure the operational reliability and the operating vacuum pressure BD. In order for a fore-vacuum to be generated, a vacuum system 4 that is joined to the gas outlet opening 31 is connected to at least one forepump 41 (e.g. a rotary vane pump) in order to generate a fore-vacuum pressure VD in the machine housing 3. In order to generate the operating vacuum pressure, in the machine housing 3, between the hub 22 and the appertaining open end 2a of the rotor jacket 21, there is at least one gas removal device 5, 51 that has a gas removal opening 53 at a suitable distance A from the inside of the rotor jacket without making contact with the rotor jacket 21, in order to efficiently pick up gas G, whereby said gas removal device 5, 51 is connected to the gas outlet opening 31 in order to discharge the picked-up gas G. Here, the gas outlet opening 31 refers to the opening in the machine housing 3 through which the gas G in the machine housing 3 would have been pumped off if the gas removal device 5, 51 had not been connected to the gas outlet opening 53. The gas G that the gas removal device 5, 51 has already removed through the gas outlet opening 31 is only transported to the outside of the machine housing 3 and then to the vacuum system 4. In this context, the gas removal device 5, 51 is arranged in such a way that, at a rotational frequency greater than 200 Hz, the rotor 2 itself conveys F part of the gas flow G that, due to the rotation of the rotor, is moving along the inside 21i of the rotor jacket 21, at least into the first gas removal device 5, 51, and consequently, the rotor itself can reduce the gas pressure in the machine housing 3 from the level of the fore-vacuum pressure VD to a lower operating vacuum pressure BD. The gas removal device 5, 51, for example, in the form of an internally hollow tube, extends from the gas outlet opening 31 in the direction of the inside of the rotor jacket. Additional details pertaining to the gas removal device 5, 51 are explained within the scope of FIG. 2.

Figure 2:
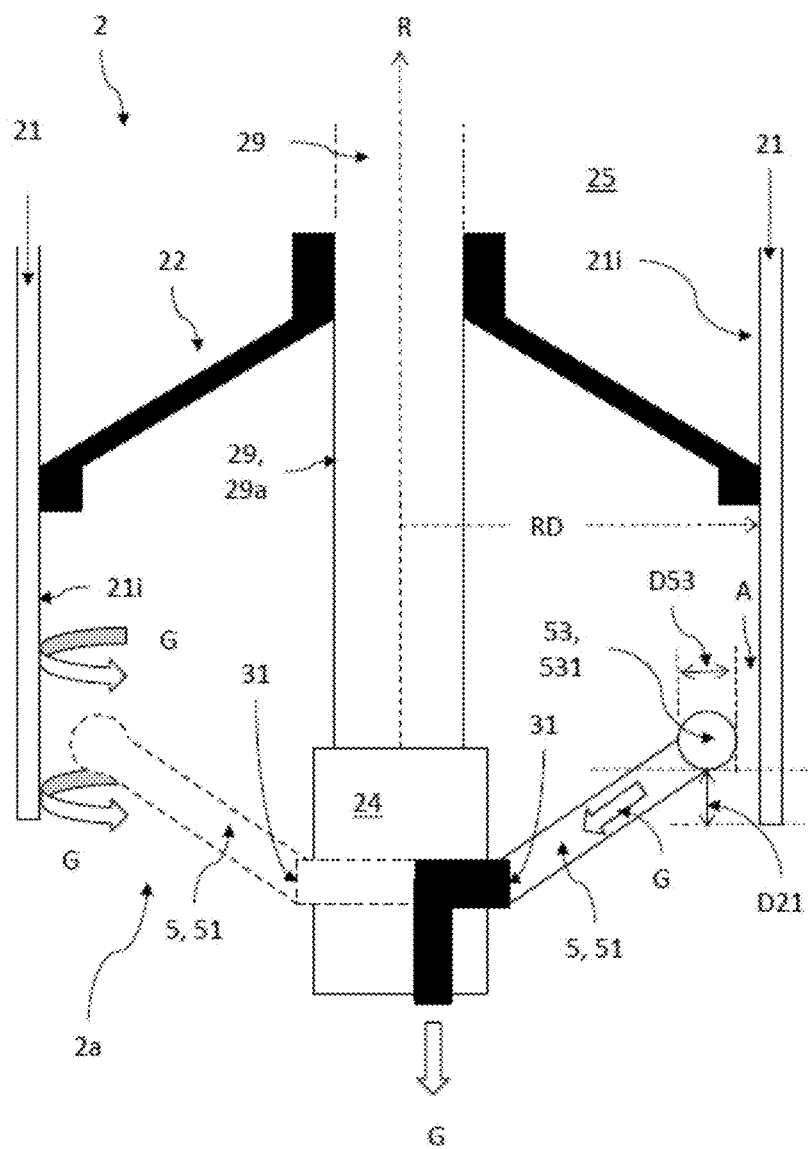
FIG. 2: the embodiment of the vacuum rotor system according to the invention as shown in FIG. 1, in an enlarged view of the rotor in the area of the lower hub.

FIG. 2 shows the embodiment of the vacuum rotor system 1 according to the invention as shown in FIG. 1, in an enlarged view of the rotor 2 in the area of the lower hub 22. Fundamentally differently shaped and configured devices which provide an open internal channel for gases G between the gas removal opening 53 and the gas outlet opening 31, 32 can all be employed as the gas removal device 5. In this context, depending on the embodiment, one or more gas removal devices 5 can be connected to the same gas outlet opening 31, 32, provided that the design of the rotor and of the bearing permit the arrangement of several gas removal devices 5 on the same side, here the side facing the open end 2a of the rotor 2. In this embodiment, in addition to the gas removal device 5, 51 already shown in FIG. 1, another gas removal device 5, 51 (indicated with a broken line) is arranged in the same plane relative to the axis of rotation R between the first (lower) hub 22 and the corresponding first open end 2a of the rotor jacket 21 of the rotor 2. In other embodiments, for example, four or more gas removal devices 5 arranged symmetrically with respect to each other can be arranged between the first (lower) hub 22 and the corresponding first open end 2a of the rotor jacket 12 (of the rotor 2). The material of the gas removal device 5 consists of a vacuum-capable material such as, for instance, stainless steel, so as to cause little or no intrinsic out-gassing in the machine housing. For example, pipe connections can used that extend in the radial direction from the gas outlet opening 53, optionally at a suitable angle, optionally at an angle that diverges from 90° relative to the axis of rotation R, all the way to the rotor jacket 21, and before reaching the rotor jacket 21, they can have a curvature so that the open pipe opening that functions as the gas removal opening 53 (as shown here at the right-hand gas removal opening) is oriented perpendicularly along the inside 21i of the rotor jacket 21 in the gas flow G. The gas flow along the inside 21i of the rotor jacket 21 is depicted schematically on the left-hand side of the rotor by the two curved arrows G. The gas removal device 5, 51 indicated by the broken line also has a gas removal opening 53 that, perpendicular to the gas flow G, is oriented into the gas flow G, whereby said gas removal opening 53 is not visible here due to the orientation (oriented towards the back). Here, the gas removal surface 53 refers to the surface that is oriented perpendicular to the gas flow G. In this context, the gas removal opening 53 can have different shapes, for example, round, oval or elliptical shapes. Excessively sharp-edged forms can be unsuitable due to the turbulence that they cause in the gas flow G. Here, the distance A between the gas removal opening 53 of the first gas removal device 5, 51 and the rotor jacket 21 is less than 10% of the radius RD of the cylindrical rotor 2 at this place. In a preferred embodiment, the distance A is between 1% and 5% of the radius RD of the rotor 2 at this place. Consequently, the gas removal opening 53 has an efficient gas removal surface 531 with a mean diameter D53 and it is oriented perpendicular to the gas flow G along the rotor jacket 21. The mean diameter D53 is, for instance, between 3% and 10% of the radius RD of the rotor 2. Here, the first gas removal device 5, 51 is arranged at a distance D21 from the open end of the rotor jacket 21 amounting to at least three times the mean diameter D53, so that the gas can flow unhindered into the gas removal device. If the distance D21 were shorter, then at least a part of the gas flow G would become turbulent at the edge of the rotor jacket 21 towards the open end 2a or else it would drain at the edge, which would lead to a reduction in the gas flow G flowing into the gas removal device 5, 51. As a result, it would not be possible to achieve the lowest possible operating vacuum pressure with this arrangement.

Figure 3:
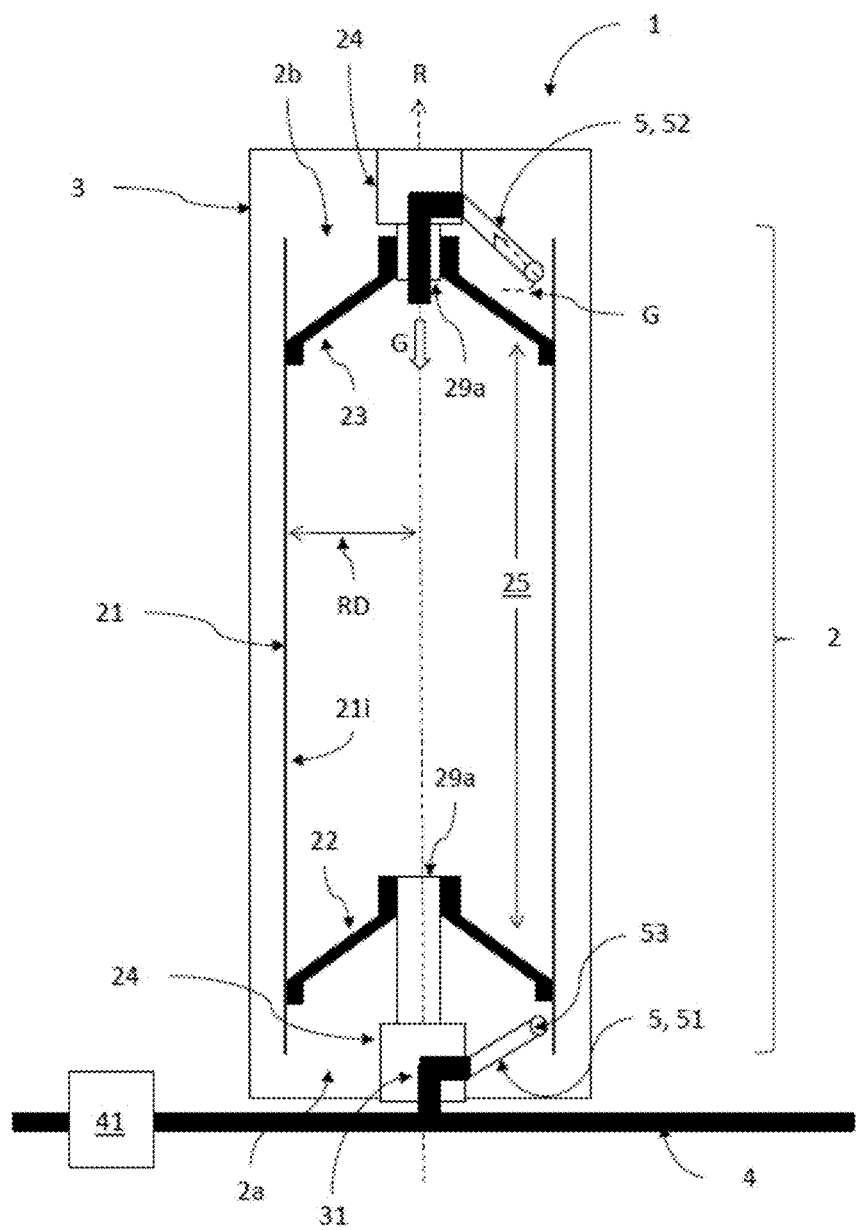
FIG. 3: another embodiment of the vacuum rotor system according to the invention, in a side view with an additional second gas removal device.

FIG. 3 shows another embodiment of the vacuum rotor system 1 according to the invention, in a side view with an additional second gas removal device 5, 52. In this embodiment, as was the case with the first gas removal device 5, 51, there is a second gas removal device 5, 52 arranged between the other hub 23 (second hub 23 or upper hub 23) and a second end 2b of the rotor jacket 21 belonging correspondingly to this second hub 23, at a suitable distance A from the inside 21i of the rotor jacket 21 without making contact with the rotor jacket 21, in order to additionally pick up gas G. In this process, the hubs 22, 23 define an intermediate volume 25 between the hubs 22, 23 in the hollow cylindrical rotor 2 shown here, whereby the second gas removal device 5, 52 in this embodiment is arranged in such a way that the picked-up gas G is conveyed into the intermediate volume 25. In this embodiment, the hubs 22, 23 are configured so as to be impermeable to gas in order to form a gas-tight intermediate volume 25 that serves as a temporary intermediate storage unit for the gas G that has been removed from the area of the second end of the rotor. As long as the rotational frequency of the rotor achieves the self-pumping effect according to the invention, no gas escapes from the intermediate volume 25 which, since the gas is conveyed into the intermediate volume 25, has a higher pressure than the operating pressure BD of the rotor outside of the intermediate volume 25. Preferably, the gas-carrying channel, which is situated between the second gas removal device 5, 52 and the intermediate volume 25, runs all the way through the upper bearing 24 and the journal 29a. In this embodiment, the rotor 2 is mounted via hubs 22, 23 that are mounted separately from each other in separate journals 29a. In this embodiment, the hubs 22, 23 are connected to each other only via the rotor jacket 21. The person skilled in the art is capable of suitably configuring the gas-carrying channel, which is situated between the second gas removal device 5, 52 and the intermediate volume 25. When it comes to the second gas removal device 5, 52, the same arrangements, orientations, distances A, distances D21 and mean diameters D53 of the gas removal surface 53 can be selected as was the case with the first gas removal device 5, 51; in this context, also see FIG. 2. This also applies to the following embodiments according to FIGS. 4 and 6. For additional details, reference is hereby made to FIGS. 1 and 2 as well.

Figure 4:
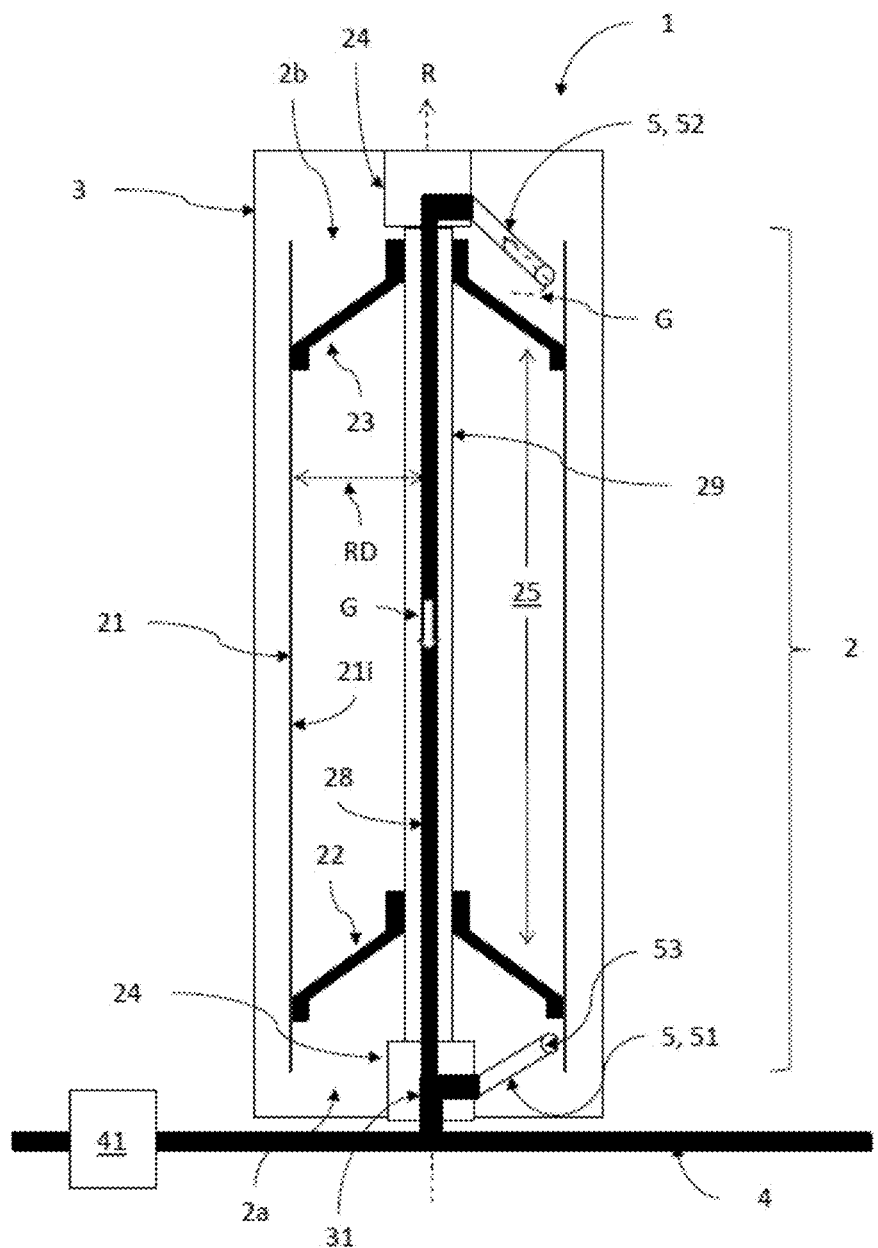
FIG. 4: another embodiment of the vacuum rotor system according to the invention, in a side view, with an additional second gas removal device that has a direct gas connection to the gas outlet opening of the first gas removal device.

FIG. 4 shows another embodiment of the vacuum rotor system 1 according to the invention, in a side view with an additional second gas removal device 5, 52 that has a direct gas connection 28 to the gas outlet opening 31 of the first gas removal device 5, 51. As a variant of the embodiment shown in FIG. 3, in the embodiment shown here, the second gas removal device 5, 52 does not convey the gas G that has been removed from the area between the second (upper) hub 23 and the open second end 2b of the rotor 2 into the intermediate volume 25, but rather, all the way through this intermediate volume 25 to the first gas outlet opening 31 so that it can be conveyed further out of the machine housing 3 and into the vacuum system 4. In this context, the direct connection 28 between the second gas removal device 5, 52 and the gas outlet opening 31 passes through a shaft 29 that joins the two hubs 22, 23 and is connected to the gas channel in a suitable manner between the first gas outlet opening 31 and the vacuum system 4. The direct connection here has a cross section that is selected in such a way that this direct connection 28 can be integrated into the shaft 29 of the rotor 2.

Figure 5:
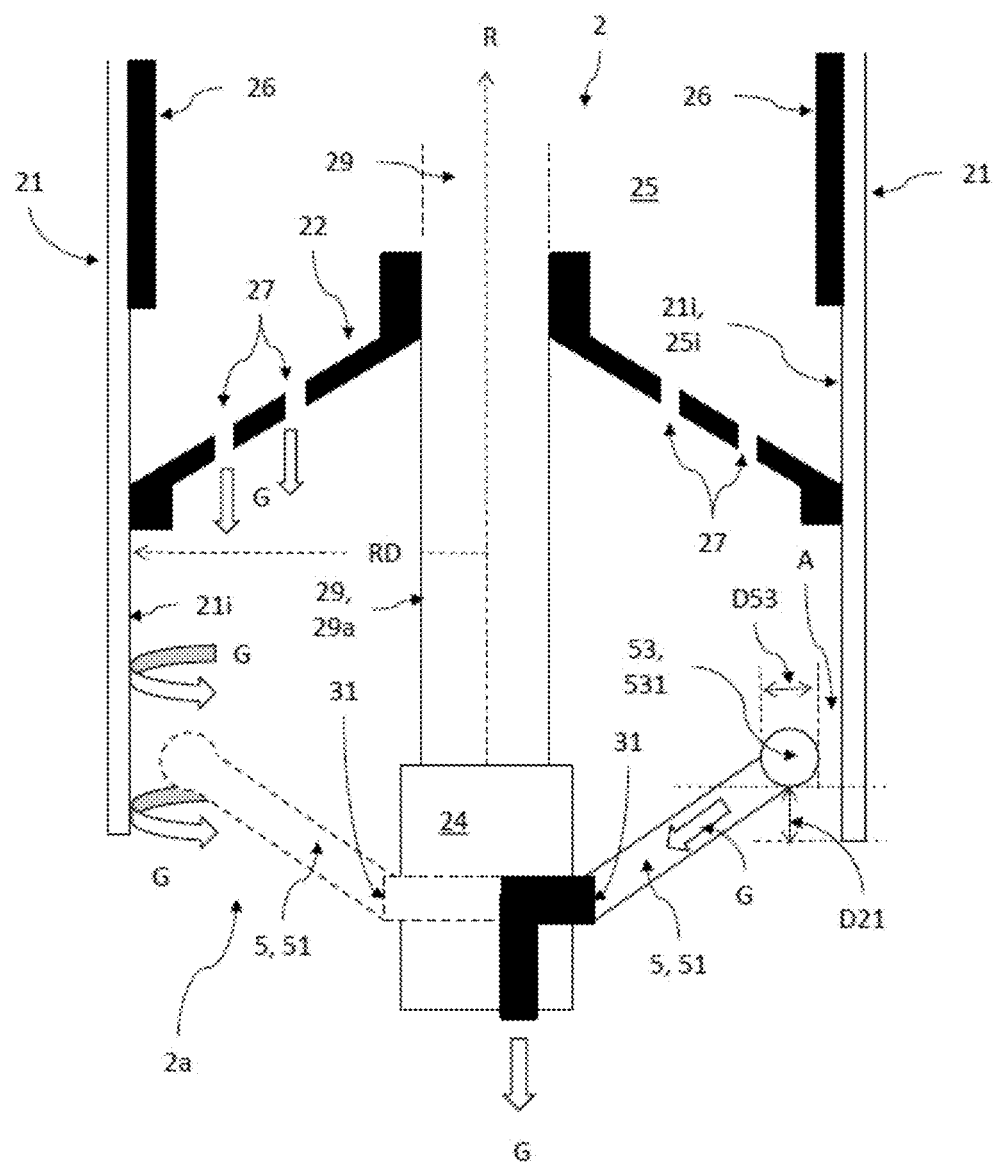
FIG. 5: another embodiment of the vacuum rotor system according to the invention as shown in FIG. 3*a*, in an enlarged view of the rotor in the area of the lower hub, which is gas-permeable here.

FIG. 5 shows another embodiment of the vacuum rotor system 1 according to the invention as shown in FIGS. 2 and 3, in an enlarged view of the rotor 2 in the area of the lower hub 22, which is gas-permeable here. Here, a gas-absorbing layer 26 is arranged on part of the inside 25i of the intermediate volume 25. This layer 26 absorbs the gas that is present in the intermediate volume 25 and that is then conveyed into the intermediate volume 25, for example, by the second gas removal device 5, 52 according to FIG. 3. When it comes to the otherwise gas-tight intermediate volume 25, this alone causes the gas pressure in the intermediate volume 25 to be reduced, even in the case of a gas-impermeable lower hub 22. In this embodiment, however, in addition, the hub 23 that faces the second gas removal device 5, 52 is gas-impermeable and the hub 22 (lower hub 22 or first hub 22) that faces the first gas removal device 5, 51 is configured so as to be at least partially gas-permeable, so that the gas G conveyed by the second gas removal device 5, 52 into the intermediate volume 25 can escape via the gas-permeable hub 22 in the direction of the first gas removal device 5, 51. In this manner, the first gas removal device 5, 51 can also discharge the gas picked up by the second gas removal device 5, 52 via the gas outlet opening 31 all the way through the machine housing 3 and out into the vacuum system 4, thereby further lowering the operating vacuum pressure in the machine housing 3. Moreover, as a result, the pumping off of the gas volume that is in intermediate storage is also improved at a low rotational speed. The gas permeability of the first (lower) hub 22 in this embodiment is achieved by a plurality of holes 27 which are preferably arranged symmetrically on the hub 22.

Figure 6:
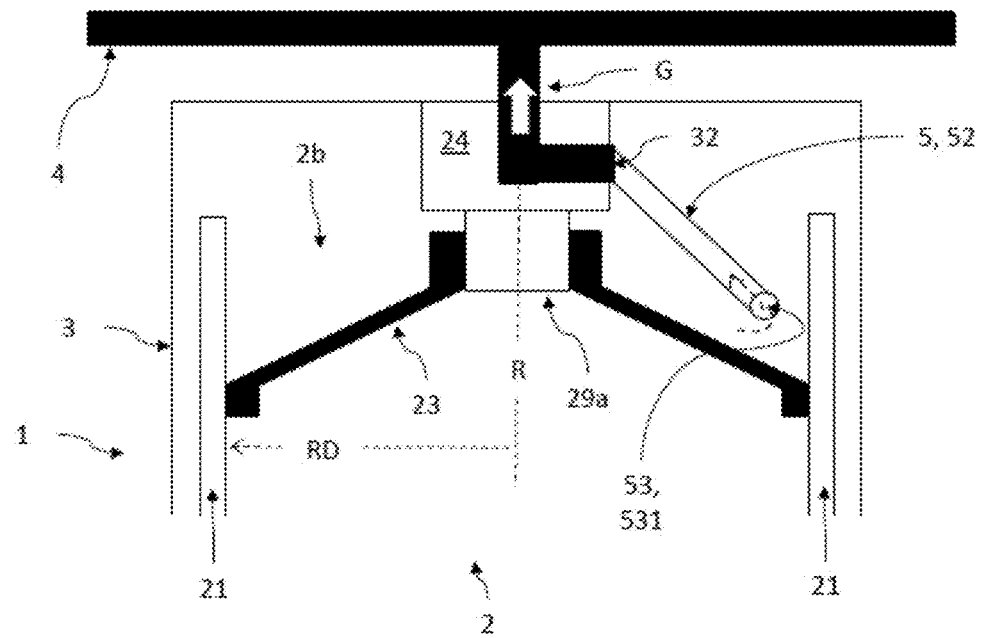
FIG. 6: another embodiment of the vacuum rotor system according to the invention, in a side view, with an additional second gas removal device that has a direct gas connection to the second gas outlet opening.

FIG. 6 shows another embodiment of the vacuum rotor system 1 according to the invention, in a side view, with an additional second gas removal device 5, 52 that has a direct gas connection to a second gas outlet opening 32. The vacuum rotor system 1 here comprises an additional gas outlet opening 32 on the side of the machine housing 3 located opposite from the other gas outlet opening 31, whereby, in order for the second gas removal device 5, 52 to discharge the gas G it has picked up, it is connected to the additional gas outlet opening 32 which, in turn, is connected to the vacuum system 4. Owing to this direct connection, the gas G picked up by the second gas removal device 5, 51 can be removed from the machine housing 3 efficiently since this is the shortest path, thereby further reducing the operating vacuum pressure.

Figure 7:
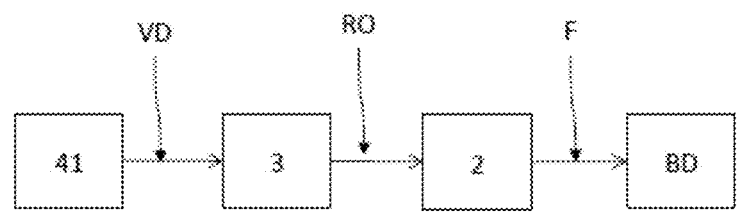
FIG. 7: an embodiment of the method according to the invention, for the operation of the vacuum rotor system.

FIG. 7 shows an embodiment of the method according to the invention, for the operation of the vacuum rotor system 1, comprising the steps of generating a fore-vacuum pressure VD in the machine housing 3 by means of a vacuum system 4 that is connected to the gas outlet opening 31 and that has at least one forepump 41, and of reducing the pressure in the machine housing 3 from the fore-vacuum pressure VD to a lower operating vacuum pressure BD by means of the rotor 2 itself due to rotation RO, in that at least one first gas removal device 5, 51 that has a gas removal opening 53 to efficiently pick up gas G in the machine housing 3 is arranged between the hub 22 and the appertaining open end 2a of the rotor jacket 21, at a suitable distance A from the inside 21i of the rotor jacket 21 without making contact with the rotor jacket 21, whereby said first gas removal device 5, 51 is connected to the gas outlet opening 31 in order to discharge the picked-up gas G, whereby, at a rotational frequency greater than 200 Hz, the rotor 2 itself conveys F part of the gas flow G that, due to the rotation of the rotor, is moving along the inside 21i of the rotor jacket 21 at least into the first gas removal device 5, 51.

By means of the embodiments shown in FIGS. 1 to 6, it is possible, for instance, at an operating vacuum pressure of $10^{-4}$ mbar at the pump connection flange to achieve operating vacuum pressures BD of $2*10^{-3}$ mbar in the area between the upper hub 23 and the open (second) end 2b of the rotor 2. In comparison to this, in case of turbopumps instead of the gas removal device according to the invention, at an operating vacuum pressure of $10^{-5}$ mbar at the pump connection flange, only operating vacuum pressures of a mere $10^{-2}$ mbar are achieved on the opposite side of the hub, so that the vacuum rotor system 1 according to the invention is capable of achieving not only comparable pressures that are more cost-effective, but also a better pressure distribution.

The embodiments shown here constitute merely examples of the present invention and consequently must not be construed as being of a limiting nature. Alternative embodiments taken into consideration by the person skilled in the art are likewise encompassed by the protective scope of the present invention.

LIST OF REFERENCE NUMERALS 1 vacuum rotor system
2 rotor
2a, 2b (two) open ends of the rotor perpendicular to the axis of rotation
21 rotor jacket
21i inside of the rotor jacket
22 a hub (first hub or lower hub)
23 another hub (second hub or upper hub)
24 bearings in which the hubs are mounted
25 intermediate volume in the rotor between the hubs
25i inside of the intermediate volume
26 gas-absorbing layer
27 holes in the gas-permeable hub
28 direct connection between the second gas removal device and the gas outlet opening 31
29 shaft that joins the two hubs
29a journal that each time connects one of the hubs to the bearing
3 machine housing
31 (first) gas outlet opening
32 additional (second) gas outlet opening at the sides of the machine housing opposite from the other gas outlet opening 31
4 vacuum system
41 fore-vacuum pump in the vacuum system
5 gas removal device (first or second)
51 first gas removal device
52 second gas removal device
53 gas pick-up opening
531 gas removal surface
A distance between the gas pick-up opening and the inside of the rotor jacket
BD operating vacuum pressure
D21 distance between the gas removal device and the open end of the rotor
D53 mean diameter of the gas removal surface
F conveying gas into the gas removal device due to the rotation of the rotor
G gas, gas flow
R axis of rotation
RD radius of the rotor
RO rotation of the rotor
VD fore-vacuum pressure

The invention claimed is:

1. A vacuum rotor system comprising a hollow rotor with a rotor jacket that is open at both ends perpendicular to the axis of rotation and with at least two hubs that are connected to the inside of the rotor jacket and that are suitably mounted in appropriate bearings so that the rotor can rotate, also comprising a machine housing that encloses the rotor and that has at least one gas outlet opening to discharge gases from the machine housing, also comprising a vacuum system that is connected to the gas outlet opening and that has at least one forepump for purposes of generating a fore-vacuum pressure in the machine housing, and also comprising at least one first gas removal device with a gas pick-up opening that is arranged in the machine housing between the hub and the appertaining open end of the rotor jacket, at a suitable distance from the inside of the rotor jacket without making contact with the rotor jacket, in order to efficiently pick up gas, whereby said first gas removal device is connected to the gas outlet opening in order to discharge the picked-up gas and it is arranged in such a way that, at a rotational frequency greater than 200 Hz, the rotor itself conveys part of the gas flow that, due to the rotation of the rotor, is moving along the inside of the rotor jacket, at least into the first gas removal device, and consequently, the rotor itself can reduce the gas pressure in the machine housing from the level of the fore-vacuum pressure to a lower operating vacuum pressure.

2. The vacuum rotor system according to claim 1, characterized in that
the distance between the gas pick-up opening of the first gas removal device and the rotor jacket is less than 10% of the radius of the rotor at this place.

3. The vacuum rotor system according to claim 1, characterized in that
the gas pick-up opening comprises an efficient gas pick-up surface that has a mean diameter and is oriented along the rotor jacket perpendicular to the gas flow.

4. The vacuum rotor system according to claim 3, characterized in that
the first gas removal device is arranged inside the rotor jacket at a distance from the open end of the rotor jacket which amounts to at least three times the mean diameter.

5. The vacuum rotor system according to claim 3, characterized in that
the mean diameter is between 3% and 10% of the radius of the rotor at this place.

6. The vacuum rotor system according to claim 1, characterized in that,
the first gas removal device has a cross section parallel to the gas flow along the insides of the rotor jacket that is suitable to minimize turbulence of the gas flow through the first gas removal device.

7. The vacuum rotor system according to claim 1, characterized in that,
as was the case with the first gas removal device, at least one second gas removal device is arranged between the other hub and one end of the rotor jacket that correspondingly belongs to this other hub, at a suitable distance from the inside of the rotor jacket without making contact with the rotor jacket, in order to pick up gas.

8. The vacuum rotor system according to claim 7, characterized in that,
the hubs define an intermediate volume between the hubs in the hollow rotor, and the second gas removal device is arranged in such a way that the gas that has been picked up is conveyed into the intermediate volume.

9. The vacuum rotor system according to claim 8, characterized in that
the hubs are configured so as to be impermeable to gas in order to form a gas-tight intermediate volume.

10. The vacuum rotor system according to claim 8, characterized in that,
the hub facing the second gas removal device is impermeable to gas and the hub facing the first gas removal device is at least partially permeable to gas, so that gas conveyed by the second gas removal device into the intermediate volume can escape through the gas-permeable hub in the direction of the first gas removal device.

11. The vacuum rotor system according to claim 10, characterized in that,
the gas-permeable hub comprises a symmetrical arrangement of holes that serve to achieve the gas permeability.

12. The vacuum rotor system according to claim 7, characterized in that,
in order for the second gas removal device to discharge the gas it has picked up, it is connected directly to the gas outlet opening.

13. The vacuum rotor system according to claim 12, characterized in that,
the direct connection between the second gas removal device and the gas outlet opening runs through a shaft (29) that joins the two hubs.

14. The vacuum rotor system according to claim 7, characterized in that,
the vacuum rotor system comprises another gas outlet opening on the side of the machine housing that is opposite from the other gas outlet opening; in order for the second gas removal device to discharge the gas it has picked up, it is connected to the other gas pick-up opening which is connected to the fore-vacuum system.

15. A flywheel energy storage unit comprising a plurality of vacuum rotor systems according to claim 1, whereby, in order to generate a fore-vacuum pressure in each of the machine housings, the vacuum system of each vacuum rotor system is combined to form a joint energy storage vacuum system having at least one fore-vacuum pump that provides the fore-vacuum pressure in each machine housing.

16. A method to operate the vacuum rotor system according claim 1, comprising a hollow rotor with a rotor jacket that is open at both ends perpendicular to the axis of rotation and with at least two hubs that are connected to the inside of the rotor jacket and that are suitably mounted in appropriate bearings so that the rotor can rotate, also comprising a machine housing that encloses the rotor and that has at least one gas outlet opening to discharge gas from the machine housing, said method comprising the following steps:
a fore-vacuum pressure is generated in the machine housing by means of a vacuum system that is connected to the gas outlet opening and that has at least one forepump; and
the pressure in the machine housing is reduced from the level of the fore-vacuum pressure to a lower operating vacuum pressure by means of the rotor itself, in that at least one first gas removal device having a gas pick-up opening to efficiently pick up gas in the machine housing is arranged between the hub and the appertaining open end of the rotor jacket, at a suitable distance from the inside of the rotor jacket without making contact with the rotor jacket, whereby said first gas removal device is connected to the gas outlet opening so that the gas that has been picked up can be discharged, whereby, at a rotational frequency of more than 200 Hz, the rotoritself conveys part of the gas flow that, due to the rotation of the rotor, is moving along the inside of the rotor jacket, at least into the first gas removal device.

* * * * *